United States Patent [19]

Sasaki et al.

[11] Patent Number: 4,963,269

[45] Date of Patent: Oct. 16, 1990

[54] WATER OZONIZATION METHOD

[75] Inventors: Toshihiko Sasaki; Hatsuo Yotsumoto, both of Hyogo, Japan

[73] Assignee: Mitsubishi Denki Kabushiki Kaisha, Tokyo, Japan

[21] Appl. No.: 472,545

[22] Filed: Jan. 30, 1990

Related U.S. Application Data

[62] Division of Ser. No. 138,190, Dec. 28, 1987, Pat. No. 4,906,358.

[30] Foreign Application Priority Data

Dec. 26, 1986 [JP] Japan .................. 61-203261[U]

[51] Int. Cl.$^5$ .............................................. C02F 1/78
[52] U.S. Cl. ..................................... 210/760; 210/765
[58] Field of Search ............... 210/760, 765, 791, 793, 210/764, 167, 169, 192, 144, 196, 205, 258, 275, 441, 416.1, 416.2, 416.3; 422/28, 29, 33

[56] References Cited

U.S. PATENT DOCUMENTS

| | | | |
|---|---|---|---|
| 2,970,821 | 2/1961 | Axt | 210/760 X |
| 3,997,631 | 12/1976 | Matsuoka et al. | 210/192 X |
| 4,052,960 | 10/1977 | Birkbeck et al. | 210/169 X |
| 4,172,786 | 10/1978 | Humphrey et al. | 210/760 X |
| 4,255,257 | 3/1981 | Greiner et al. | 210/760 X |
| 4,298,467 | 11/1981 | Gartner et al. | 210/192 X |
| 4,595,498 | 6/1986 | Cohen et al. | 210/192 |
| 4,640,783 | 2/1987 | Kern | 210/765 X |
| 4,804,478 | 2/1989 | Tamir | 210/760 X |

FOREIGN PATENT DOCUMENTS 140414 9/1982 Japan .

Primary Examiner—Tom Wyse
Attorney, Agent, or Firm—Sughrue, Mion, Zinn, Macpeak & Seas

[57] ABSTRACT

A water ozonization system equipped with a filter in that water can be treated with ozone through the steps of installing a diverging pipe therein to allow part of raw water to diverge from the discharge side of a raw water pump, the diverging pipe being fitted with an ejector; injecting and introducing the ozone obtained from an ozonizer into the ejector via its suction port in order to form ozonous water; returning the ozonized water via a diverging pipe to the suction side of the raw water pump; and supplying the ozonous water and unreacted ozonizing gas to the whole quantity of raw water within the limit to which the raw water pump produces no cavitation so as to increase ozone absorption efficiency with the agitation of pump impellers for accelerating ozonization and the reaction of the unreacted ozonizing gas in the raw water pump on the whole quantity of the raw water by ozonizing means.

2 Claims, 2 Drawing Sheets 4,963,269

WATER OZONIZATION METHOD

This is a divisional of application No. 07/138,190 filed Dec. 28, 1987, now U.S. Pat. No. 4,906,358.

BACKGROUND OF THE INVENTION

Industrial Field of the Invention

The present invention relates to a water ozonization system for improving water quality and more particularly for improving the quality of raw water and rinsing its filter efficiently and economically by injecting ozone at the time of rinsing the filter.

Prior Art

FIG. 2 is a flowchart showing a piping in a conventional bathhouse, with an arrangement of bath water 1, a valve 2 for regulating the quantity of circulating water, a hair collector 3, a raw water pump 4, a forward water circulating valve 5, a reverse rinsing water valve 6, a reverse rinsing water discharge valve 7, a filter 8, an air vent valve 9 for automatically discharging the air gathered in the filter, a valve 10 for returning the water to the bathhouse, a heat exchanger 11 for keeping constant the bath water temperature, a hypochlorous acid tank 12, a hypochlorous acid soda injection pump 13, a high polymer molecule agglomerating agent tank 14, a high polymer molecule agglomerating agent injection pump 15, a solid chlorine introducing tank 16, a reverse rinsing water supply pipe 17, a water supply valve 18, a reverse rinsing water storage tank 19, and a reverse rinsing water supply valve 20.

The operation of the water ozonization system will subsequently be described. The valves 2, 5 and 10 are opened and the valves 6, 7 and 20 are closed while the chemicals injection pumps 13, 15 are in operation. In other words, the hypochlorous acid soda 12 and the high polymer molecule agglomerating agent are injected into the bath water 1, which is sterilized by the hypochlorous acid, and micro-contaminations contained in the bath water are reduced to coarse flocs. The hair mixed with the bath water 1 containing the chemical agents 12, 13 thus injected is removed by the hair collector 3 before being circulated by the raw water pump 4. When the bath water 1 conveyed by the raw water pump 4 still carries a high percentage of contaminations, the solid chlorine is introduced from the solid chlorine introducing tank 16 and blended with the bath water 1 to increase the quantity of the chemical agent. The bath water 1 sterilized and reduced to coarse flocs by the aforesaid chemical agents is led into the filter 8 from above, wherein the contaminations in the form of coarse flocs are captured by the filtering medium. The air partly led into the filter 8 is automatically discharged through the air vent valve 9 when the air reaches a fixed quantity. The bath water from which the contaminations have been removed by the filter 8 is passed through the valve 10 for returning the water to the bathhouse into the heat exchanger 11 where it is heated up to proper temperatures before being sent to the bathhouse.

If the quantity of contaminations captured becomes equal to the tolerance of the filtering medium of the filter 8, the effect of the filter will be ruined. Therefore, th contaminations thus captured have to be discharged from the system; that is, the filter has to be rinsed reversely by a system in direction of arrow B, an example of which will be described.

A tap water pipe is coupled to the reverse ringing water supply pipe 17, for instance, and the water supply valve 18 is opened to store water in the reverse rinsing water storage tank 19. At the time of reverse rinsing, each of the system valves is set in the following stage: the valves 20, 6 and 7 are opened; the valves 2, 5 and 10 are closed; the raw water pump 4 in operation; and the chemical agent pumps 13, 15 in the stationary state. More specifically, the water stored in the reverse rinsing water storage tank is passed through the reverse rinsing water valve 20 and caused by the raw water pump 4 to pass through the valve 6. Then the rinsing water is blown up from the bottom of the filter 8 to force the contaminations captured by the filtering medium out of the filter 8, whereby it is discharged via the valve 7 from the system as drain.

Since the conventional bath water treatment system equipped with a filter and employed to circulate and reuse the water is thus arranged, there is required a large quantity of chemical agents, e.g., the hypochlorous acid soda, the high polymer molecule agglomerating agent and the solid chlorine agent for additional injection when the percentage of contaminations is high. In consequence, the strong odor of chlorine in the bathhouse, for instance, makes bathers feel uncomfortable and besides the chlorine tends to not only corrode the metals used therein but also kill plants. Moreover, the surface of the filtering medium of the filter is quickly clogged because the high polymer molecule agglomerating agent is used to reduce the contaminations to coarse flocs excessively and therefore the reverse rinsing is needed a number of times. The filtering medium, ordinarily composed of small diameter sands formed into layers allows the propagation of microbes at all times and their growth makes it difficult to completely remove the microbes only by reverse rinsing with tap water and therefore to recover the filtering medium, thus posing a problem in that, on rare occasions, the filtering medium runs out and floats into the bathhouse.

SUMMARY OF THE INVENTION

The present invention is intended to solve the aforesaid problems and it is therefore an object of the invention to provide a water treatment system capable of reducing by a large margin or nullifying the quantity of chemical agents, removing microbes grown in its filtering medium, and reducing to a great extent the number of times required for reverse filter rinsing or the quantity of reverse rinsing water to attempt the complete recovery of the filtering medium so that not only water quality but also the atmosphere therein can greatly be improved.

The water ozonization system according to the present invention is designed to improve water quality by having ozone react on and being absorbed in raw water with high efficiency while reducing by a large margin or nullifying the quantity of chemical agents for use and further to efficiently remove microbes grown in the filtering medium of its filter and contaminations captured by means of a combination of ozonous water and an ozonizing gas in the form of small air bubbles for reversely rinsing the filter.

In the water ozonization system for improving water quality according to the present invention, part of the raw water or rinsing water is diverged and an ejector is arranged in the diverging circuit to form ozone, whereas the quantity of ozonizing gas in the form of small air bubbles is limited to the extent that a raw water pump produces no cavitation in order to improve the ozone absorptivity resulting from the agitation of pump impellers. When the filtering medium of its filter is reversely rinsed, moreover, the ozonous water and unreacted gas in small bubbles are blown into the filtering medium to kill the microbes grown in the filtering medium and the surfacing force of the ozonizing gas in small bubbles is made use of discharging contaminations in the layers of the filtering medium so as to clean the filtering medium efficiently.

EMBODIMENT OF THE INVENTION

Figure 1:
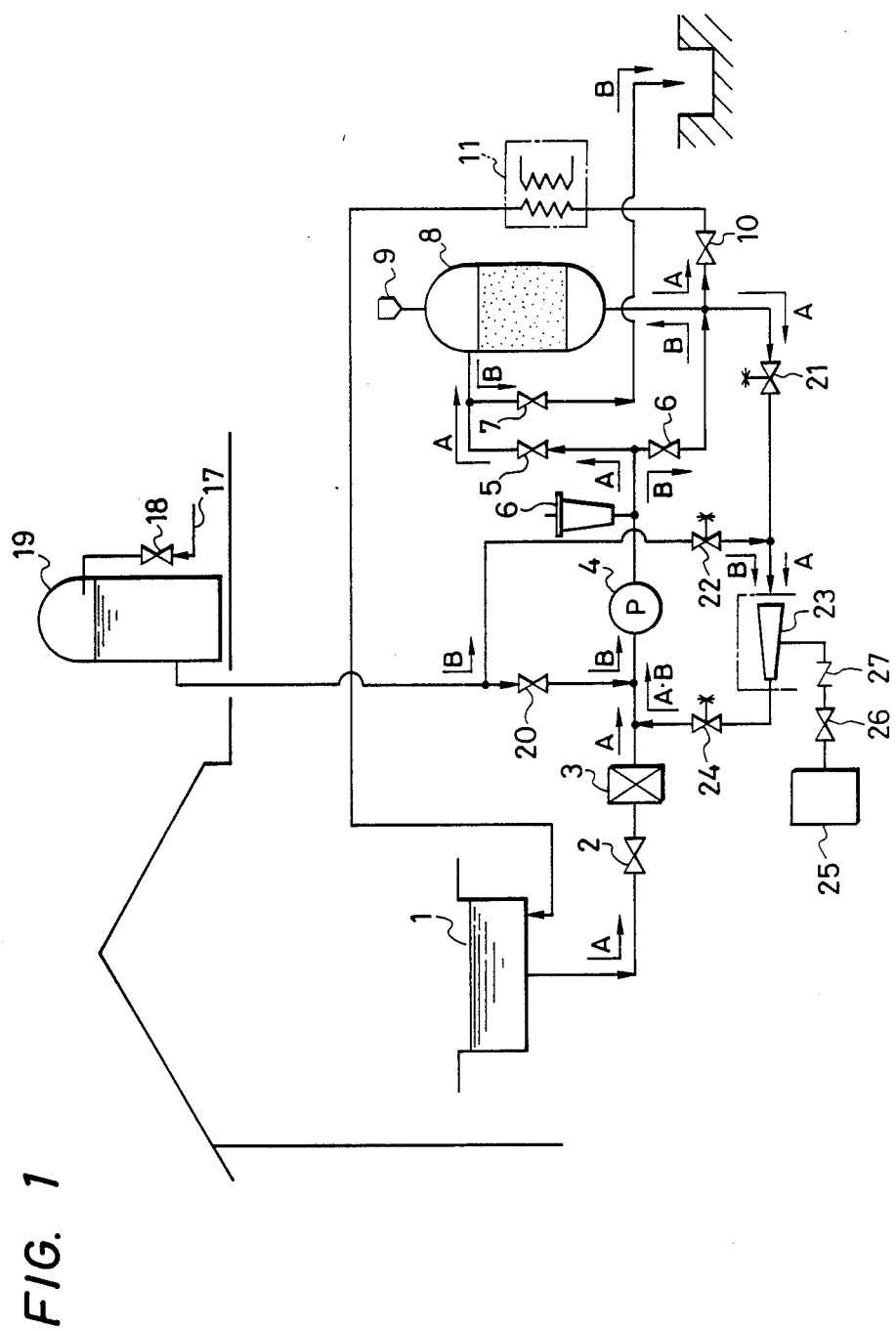
FIG. 1 is a flowchart showing the piping of a water ozonization system for treating the circulating water of a bathhouse with ozone.
Figure 2:
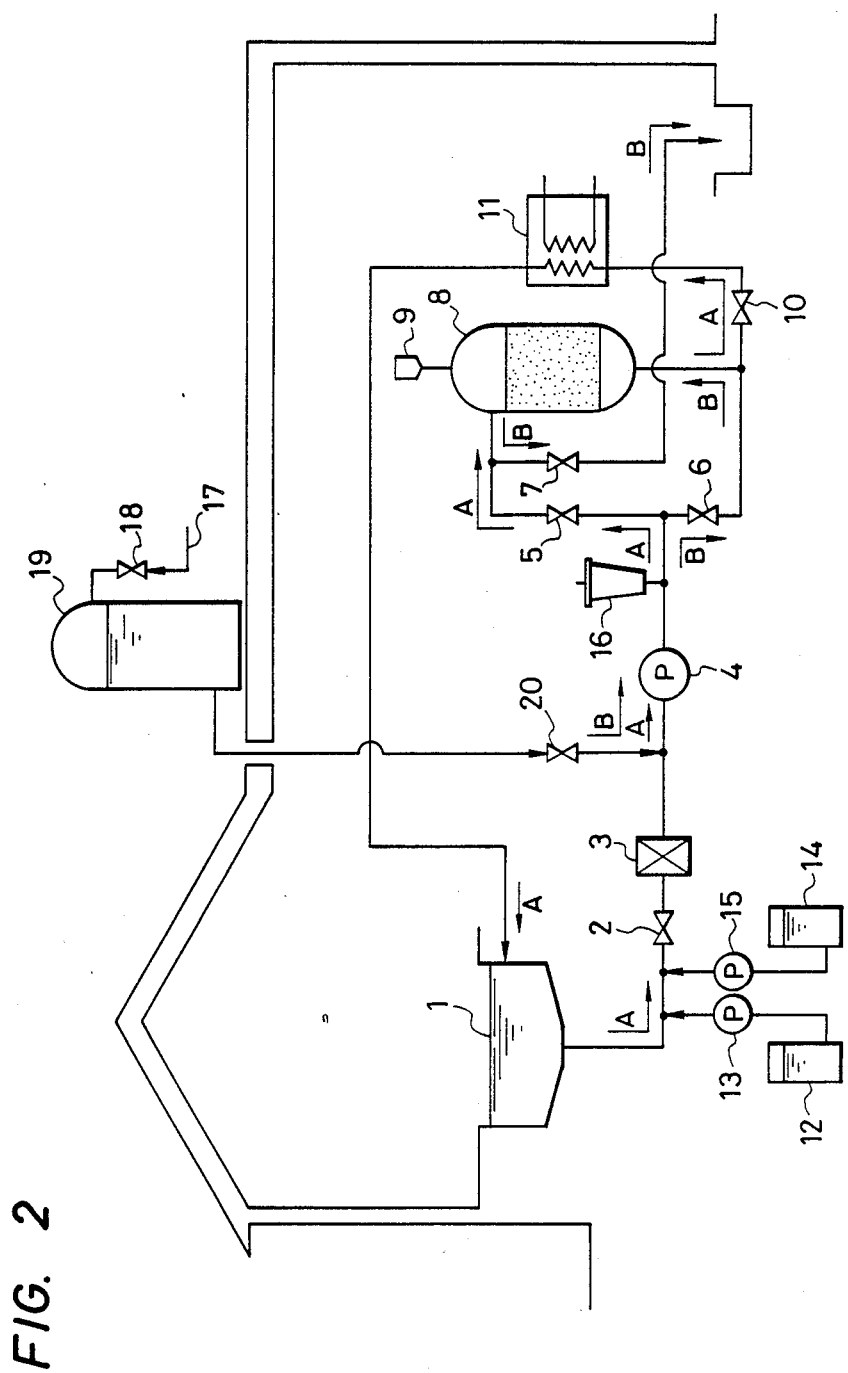
FIG. 2 is a flowchart showing the piping of a conventional water ozonization system therefor.

Referring now to the accompanying drawings, an embodiment of the present invention will be described. In FIG. 1, there is shown therein a water ozonization system comprising a circulating-water diverging valve 21; a reverse rinsing water diverging valve 22, an ejector 23 for reducing suction gas to small air bubbles and blending them with the water supplied at a high velocity of flow; a diverged-water return valve 4 coupled to the suction side of the main pipe of a raw water pump 4; an ozonizer 25 for forming ozone from air or oxygen; an ozone supply valve 26; and a check valve 27 for preventing the water from flowing back to the ozonizer 25.

The operation of the water ozonization system will subsequently be described. Bath water 1 is made clean by a circulating system as it flows in direction of arrow A. The water is caused to flow through opened valves 2, 5, 10, 21, 24 and 26 while the raw water pump 4 and the ozonizer 25 are in operation. More specifically, the bath water 1 is made to flow via the valve 2, a hair collector 3, the raw water pump 4, the valve 5, a filter 8 and the valve 10 into a heat exchanger 11 where it is heated before being returned to the bathhouse. To increase the concentration of ozonous water in that case, a fixed quantity of the water cleaned after being passed through the filter is diverged and then passed through the valve 21, the ejector 23 and the valve 24 before being blended with the circulating water 1 on the suction side of the raw water pump 4.

At that time, the ozonizing gas produced by the ozonizer 25 is injected via the valve 26 and the check valve 27 into the ejector 23 through its suction port and the ozonizing gas is changed into small air bubbles and blended with the diverged water, whereby the process of improving water quality is carried out in that sterilization and the decomposition of organic matter are implemented by means of the diverged water and ozone which is said to have oxidizing power several to several thousand times stronger than that of hypochlorous acid soda. Part of the ozonous water and that of the unreacted ozonizing gas in the form of small air bubbles are blended with the bath water on the suction side of the raw water pump 4 and that blending is further accelerated by the impellers of the raw water pump 4, so that the diverged ozonous water and the ozonizing gas in small bubbles are caused to react on and blend with the whole circulating water with high efficiency. Accordingly, the whole quantity of the circulating water is reformed by the ozone into what is of good quality and passed through the filter 8 where its floating substances are captured by layers of filtering medium and then returned to the bathhouse as clean water whose quality has been improved by the ozone, the improvement including the sterilization, decolorization and deodorization of the water.

On the other hand, the floating substances caught by the filter 8 are discharged via a system shown by an arrow B from the circulating system. Whereas the reverse rinsing water stored in a storage vessel 19 is mostly introduced via a valve 20, the circulating pump 4 and a valve 6 into the filter, it is diverged by the valve 22 into the ejector 23. By this means that the ozone supplied by the aforesaid ozonizer 25 is partly used to further improve the quality of the reverse rinsing water thus diverged and formed into small air bubbles constituting the ozonizing gas, which is blended with the reverse rinsing water passed through the valve 20, the blending being accelerated by the circulating pump 4. In consequence, the whole quantity of the circulating water is thus ozonized and the small air bubbles are allowed to pervade over the whole of the water. The reverse rinsing water in that state is introduced from the lower part of the filter 8 and used to rinse the filtering medium from its down to upper part. The ozonous water works to sterilize the substances captured by the layers of filtering medium and moreover microbes grown therein and discharges them from above. However, a large quantity of rinsing water is required to discharge the substances thus captured if the rinsing water only is employed. On the contrary, small bubbles of the air and unreacted ozonizing gas are capable of sterilizing the microbes grown in the layers of filtering medium and isolating them from the filtering medium in such a manner as to improve its air permeability. The surfacing strength of the air is simultaneously accelerated, so that a far smaller quantity of rinsing water than what is required in the case of using the rinsing water only can effectively be used to rinse, and recover the clean state of the filtering medium.

Although a description has been given of bathhouse circulating water in the above embodiment, the present invention is also applicable to the case where water is uncirculated but passed through a similar filter once. It has been so arranged that ozone is injected into the circulating water diverged and separated from the clean water obtained after being passed through the filter but it may be blended therewith on the discharge side of the raw water pump. With such an arrangement that ozone is injected from a separate system, it is solely necessary to set the destination of return water after the ozone injection on the suction side of the raw water pump. Moreover, the valves in the system may be manually operated or motor-driven and should be so arranged as to allow the circulating and rinsing water to be diverged and passed therethrough. Despite the arrangement in the aforesaid embodiment that a solid chlorine supply tank is provided to comply with the bathhouse regulations prescribing residual chlorine to be left over, any means for injecting chlorine will do for the purpose. Even if no such regulations concerning chlorine exist, the same effect as in the case of the embodiment above is needless to say achievable.

In the water treatment apparatus intended for improving water quality according to the present invention, ozone is injected into part of the circulating water on the discharge side of the raw water pump to the extent that the small quantity of ozonizing gas is supplied within the limit to which the raw water pump produces no cavitation so as to increase the ozone reaction efficiency by the agitating and blending operation of the raw water pump and to reduce by a large margin or nullify the quantity of chemical agents for use other than ozone, whereby the concentration of chlorine within the bathhouse can thus be reduced by a large margin or nullified. Accordingly, with the reduced corrosion of metals used in buildings and the improved atmosphere therein to a considerable extent, comfortable bathhouses are operated. Moreover, because the filtering medium can be rinsed and made clean economically by a smaller quantity of the ozonous water blended with the small bubbles of ozonizing gas as rinsing water for use in sterilizing microbes in the filtering medium, the present invention has the effect of obtaining highly hygienic bath water.

What is claimed is:

1. A method of ozonizing water in a water system which includes a main water line through which water is circulated, a pump for pumping said water through said main water line, and a filter for filtering said water by passing said water through said filter in a first direction, comprising the steps of:

diverging a portion of said water from a discharge side of said pump into a diverging pipe;

injecting ozone with an ejector into said diverged water in said diverging pipe to thereby form ozonous water and ozonizing gas therein, and returning said ozonous water and ozonizing gas to said main water line via said diverging pipe to a suction side of said pump, wherein the amount of ozone injected is limited such that the amount of ozonizing gas resulting therefrom produces no cavitation to said pump so as to increase ozone absorption efficiency thereby accelerating the reaction of the unreacted ozonizing gas in said pump with the water in said pump.

2. The method of ozonizing a water system according to claim 1, further comprising the following steps:

introducing fresh rinsing water into said main water line upstream of said pump and into said diverging pipe upstream of said ejector to thereby ozonize said fresh water, wherein said fresh water, said ozonous fresh water and said ozonous gas are mixed in said pump;

reverse rinsing said filter by causing the water flowing from said pump to enter the output of said filter to thereby flow through said filter in a second direction, reverse of said first direction, to thereby clean said filter.

* * * * *